(No Model.) 2 Sheets—Sheet 1.
J. A. WOTTON & W. R. POLK, Jr.
SECONDARY BATTERY.
No. 415,600. Patented Nov. 19, 1889.
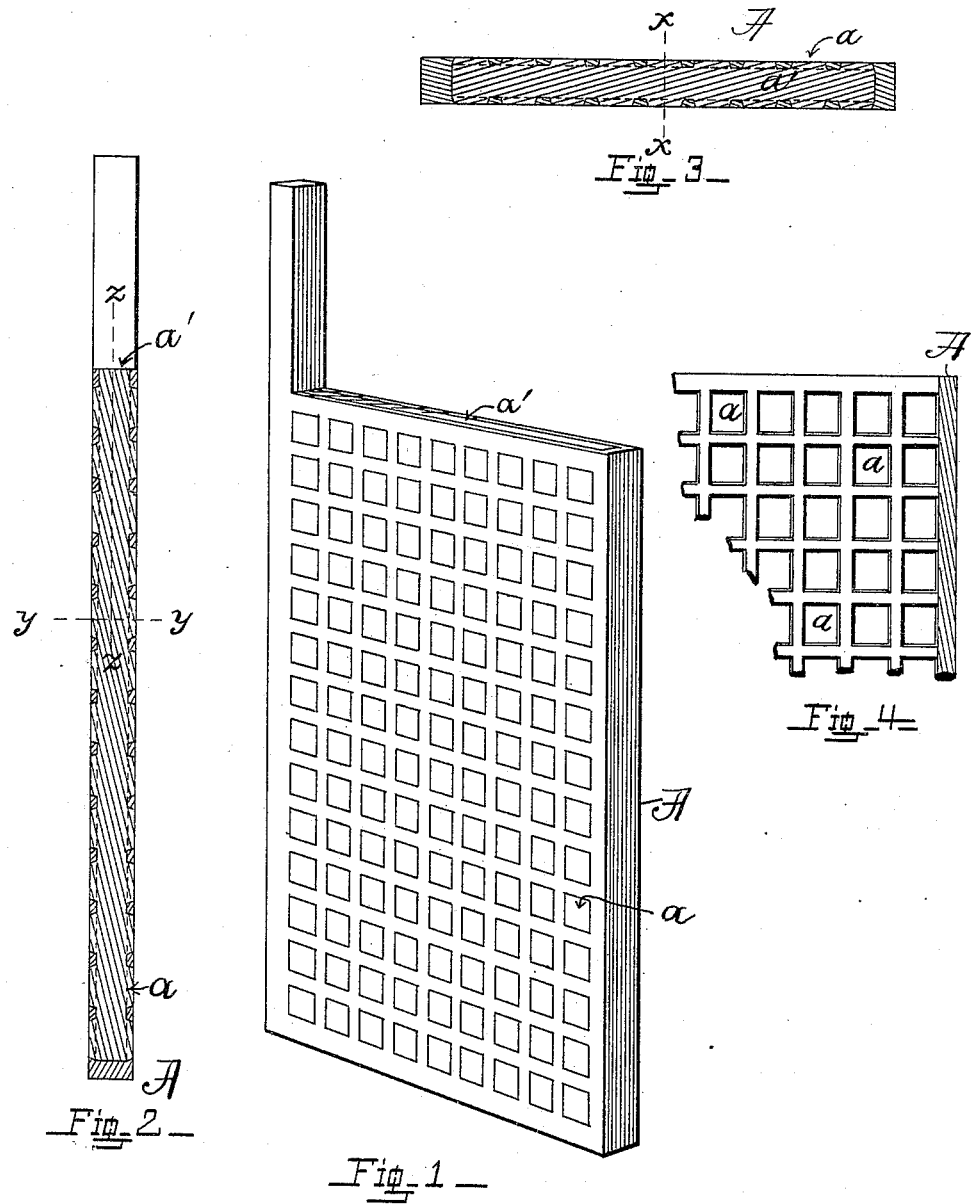

(No Model.) 2 Sheets—Sheet 2.
J. A. WOTTON & W. R. POLK, Jr.
SECONDARY BATTERY.
No. 415,600. Patented Nov. 19, 1889.
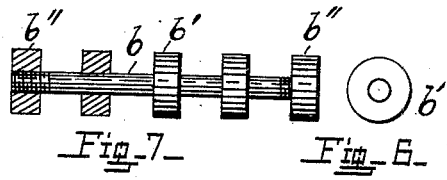
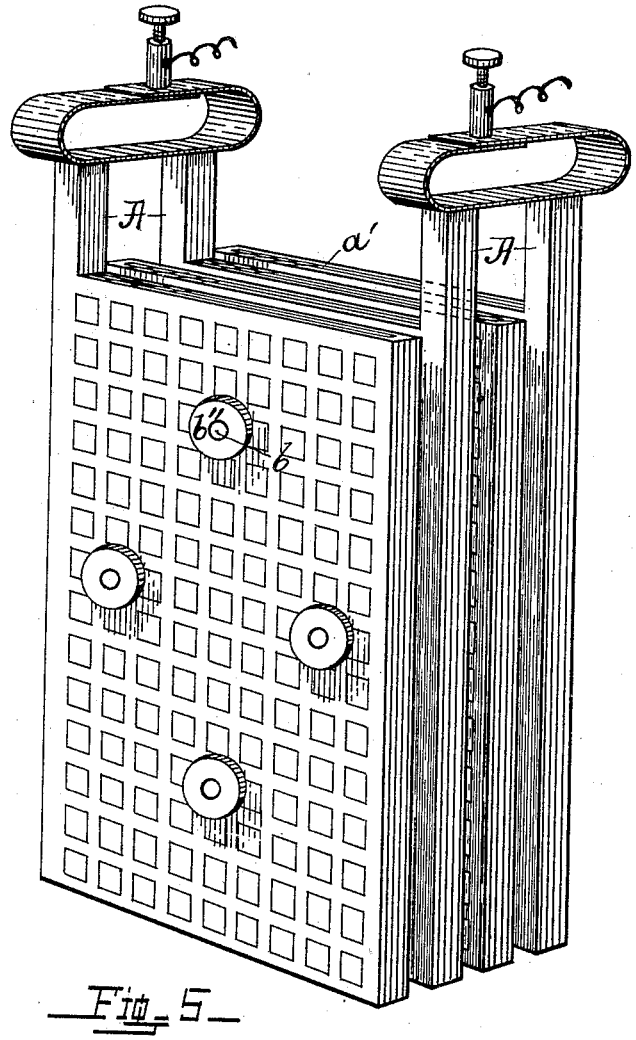

UNITED STATES PATENT OFFICE.

JAMES A. WOTTON AND WILLIAM R. POLK, JR., OF ATLANTA, GEORGIA; SAID WOTTON ASSIGNOR TO SAID POLK, JR.

SECONDARY BATTERY.

SPECIFICATION forming part of Letters Patent No. 415,600, dated November 19, 1889.

Application filed October 13, 1888. Serial No. 288,014. (No model.)

*To all whom it may concern:*

Be it known that we, JAMES A. WOTTON and WILLIAM R. POLK, Jr., citizens of the United States, and residents of Atlanta, in the county of Fulton and State of Georgia, have invented certain new and useful Improvements in Storage-Plates for Secondary Electric Batteries; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved construction of storage-plates for secondary electric batteries; and it consists of details, all of which are hereinafter fully described, and are shown in the accompanying drawings.

In the drawings, Figure 1 is a perspective view of one plate, showing its exterior appearance when filled with the active material, such as red lead, litharge, Prussian blue, &c. Fig. 2 is a vertical section on line $x\,x$, Fig. 3, showing the construction of the plate, Fig. 3 is a view on line $y\,y$, Fig. 2, showing the plate in cross-section. Fig. 4 is an enlarged view of the bars around the aperture for the entrance of the electrolyte, said figure being a section on the line $z\,z$, Fig. 2. Fig. 5 shows a sufficient number of these plates bolted together as in actual use for a cell. Fig. 6 is a side view of the washer, of non-conducting material, which holds apart the plates when bolted, as shown in Fig. 5. Fig. 7 shows a bolt with a nut on each end, all of non-conducting material, and the washers shown in Fig. 6 in their places on said bolt.

Plates as heretofore constructed have been capable of holding a very little active material, and hence their storage capacity has been limited. It is a well-known fact that a secondary battery improves steadily during the first fifty or one hundred chargings, and also that the active material becomes more porous, which of course weakens its texture, and that a direct circuit from a negative to a positive plate or in the opposite direction with no resistance short-circuits the cell where such circuit happens. Short-circuiting the cell will of course discharge it very rapidly, and it is a well-known fact that this very rapid discharge will cause the plates to buckle, and thus ruin the plates in a cell where the short circuit happens, besides the unexpected incapacitation of the cell for further work until recharged. Also in the ordinary form of plate the apertures for the admittance of the electrolyte are made in such a manner that the active material will, as soon as the material becomes porous, and hence most active in its function and weakest in texture, continually drop out of the said apertures, and the plates, in order to be greater in bulk than the electrolyte, thereby getting the best results, must be placed so close together that the small pieces of active material in dropping out of the apertures will fall against the next plate of the cell and short-circuit the cell, or the plates must be set so far apart to allow the small pieces to drop down between the plates to the bottom of the cell that the electrolytic fluid will exceed said plates in bulk and so furnish too much resistance; or the apertures in the plate must be made so small as to not allow a sufficient circulation of the fluid through the active material.

Part of our invention, and one that is the result of no inconsiderable experiment and study as a means of preventing the dropping out of these little pieces of active material, and yet resorting to none of the expedients heretofore necessary and so injurious to the battery, is shown in Figs. 2, 3, and 4, and consists in making the apertures $a$ beveled, as fully shown in these figures, smaller on the outside, and flaring from the outer side to the inner. These holes $a$ are made large and close together, which is made possible by the bevels preventing the dropping out of the active material. It will be seen that this presents the active material for contact with the electrolytic fluid over fully three-fourths of all the surface of each plate, and, as the bevel in the holes entirely prevents the dropping out of the active material and in this way the short-circuiting of the battery, the plates may be placed sufficiently close together in each cell for the best results to be obtained by having sufficient electrolytic fluid to furnish the required amount of resistance, and never too much, which latter being the case when the plates are placed far enough apart to allow the small pieces of active material to fall to the bottom of the cell instead of falling over and striking the adjacent plate.

Our invention further consists in making in connection with the device hereinbefore set forth the hollow chamber $a'$ in the center of the plate A, which enables said plate to contain much more active material, and hence increases the capacity of the cell, and by this of course increases the value of the entire battery.

The plate A may be made of hard rubber, glass, lead, or wire-cloth covered in a mold with rubber or other suitable material or any other substance sufficiently strong and being insoluble in the electrolyte. When the plate A is of non-conducting substance, a conductor must of course be used, said conductor being insoluble in the electrolyte and practically unoxidizable. The plates when placed in position in a cell are bolted together and prevented from buckling by bolts $b$, of non-conducting material, as shown in Figs. 5, 6, and 7, having washers thereon. In the building up of the plates in the cell the said plates are placed on the said bolts $b$, having between them the insulating-washers $b'$, and the whole being clamped together by a nut $b''$ on each end of the said bolt $b$, making a mass of plates thoroughly insulated, positive from negative, and having between them the proper space for the correct comparative bulk of electrolyte.

Having thus described our invention, what we claim as new, and desire to secure by Letters Patent of the United States, is—

1. In a plate for secondary electric batteries, the plate A, having apertures $a$ beveled in such a manner that each of the said apertures shall be larger at its inner than at its outer end, and the chamber $a'$, all arranged and operating substantially as shown and described, and for the purpose specified.

2. In a secondary battery, a storage-plate having an interior chamber connecting with the exterior of the plate by apertures beveled in such a manner that each perforation shall be larger at the inner and smaller at the outer end, in combination with a bolt carrying washers for holding the plate in a relative position with regard to the other plates, substantially as set forth.

In testimony whereof I hereunto affix my signature in presence of two witnesses.

JAS. A. WOTTON.
W. R. POLK, JR.

Witnesses:
A. P. WOOD,
T. R. JONES.